US006758299B2

(12) United States Patent
Ito

(10) Patent No.: US 6,758,299 B2
(45) Date of Patent: Jul. 6, 2004

(54) V-TYPE INTERNAL COMBUSTION ENGINE

(75) Inventor: Masamoto Ito, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/042,249

(22) Filed: Jan. 11, 2002

(65) Prior Publication Data

US 2002/0088658 A1 Jul. 11, 2002

(30) Foreign Application Priority Data

Jan. 11, 2001 (JP) ....................................... 2001-004175

(51) Int. Cl.[7] .................................................. B60K 8/00

(52) U.S. Cl. .............. 180/291; 123/193.1; 123/195 AC

(58) Field of Search ................................. 180/377, 378, 180/291, 374; D12/126, 127; 123/54.4, 193.1, 195 R, 195 C, 195 AC

(56) References Cited

U.S. PATENT DOCUMENTS 4,427,088 A * 1/1984 Tsuboi ........................ 180/219
5,109,943 A * 5/1992 Crenshaw et al. .......... 180/228
5,152,361 A * 10/1992 Hasegawa et al. .......... 180/230
5,951,264 A * 9/1999 Hori et al. .................. 417/360
6,085,855 A * 7/2000 Schanz et al. .............. 180/219
6,173,689 B1 * 1/2001 Tanaka ..................... 123/90.34
6,176,211 B1 * 1/2001 Tanaka et al. ........... 123/90.61
6,216,659 B1 * 4/2001 Takegami et al. ........ 123/193.5
6,257,178 B1 * 7/2001 Laimbock .................. 123/54.1
6,315,072 B1 * 11/2001 Brown et al. ............... 180/228
6,364,797 B1 * 4/2002 Ikusue et al. ............... 474/148

FOREIGN PATENT DOCUMENTS

JP 01077722 A * 3/1989 ........... F02B/61/02
JP 2000-120410 4/2000

* cited by examiner

*Primary Examiner*—Lesley D. Morris
*Assistant Examiner*—Daniel Yeagley
(74) *Attorney, Agent, or Firm*—Birch, Stewart, Kolasch & Birch, LLP

(57) ABSTRACT

A V-type internal combustion engine is capable of preventing a crankcase and a transmission case from getting dirty by smoothly exhausting water, or the like, dropped between the crankcase and the transmission case and the cylinder block. The V-type internal combustion engine includes a pair of cylinder blocks provided in a V shape. The cylinder blocks are attached to a crankcase. A transmission case is provided on a rear side of the crankcase, in a connected row arrangement. The crankcase and the transmission case are formed continuously, and an upper end portion of the transmission case is positioned to be higher than an upper end portion of the crankcase. This arrangement tilts the upper front portion of the crankcase downward.

7 Claims, 7 Drawing Sheets

V-TYPE INTERNAL COMBUSTION ENGINE

BACKGROUND OF THE INVENTION

1. Field of the Invention

The present invention relates to a V-type internal combustion engine. More particularly, the present invention relates to a V-type internal combustion engine for a motorcycle.

2. Description of the Relevant Art

Several structures for V-type internal combustion engines are known. For example, Japanese Unexamined Patent Application Publication No. 2000-120410 discloses one structure for a V-type internal combustion engine 100, as illustrated in FIG. 6.

The V-type internal combustion engine 100, in accordance with the background art, has a pair of cylinder blocks 102 provided in a V-shape. A crankcase 103 to is attached to the cylinder blocks 102. A transmission case 104 is provided on a rear side of the crankcase 103, in a connected row arrangement. The crankcase 103 and the transmission case 104 are formed so as to be continuous or integral.

In such a conventional V-type internal combustion engine 100, a continuous portion A of the upper end portion of the crankcase 103 and the upper end portion of the transmission case 104 is formed to be almost horizontal. Consequently, as shown in FIG. 7, a gap G is formed between the continuous portion A and the lower end portion of the cylinder block 102 positioned on the rear side. The gap G creates a problem in that water, or the like, will easily accumulate in the gap.

When water accumulates in the gap G, the surface of the crankcase 103 and the surface of the transmission case 104 are affected. For example, it is possible that rust or corrosion will gather. To address the rust concern, in an American-type motorcycle, the surface of the crankcase 103 and that of the transmission case 104 are plated. However, accumulated water will still stain the plating and leave a conspicuous and undesirable mark.

The staining problem is exacerbated when the size of a clutch of the motorcycle is increased to handle an increased output power of the V-type internal combustion engine 100. The increased clutch size requires the size of the transmission case 104 to be accordingly increased. As a result, the stain in the surface in the vicinity of the gap G becomes more conspicuous.

SUMMARY OF THE INVENTION

It is an object of the present invention to address one or more of the drawbacks associated with the background art.

An object of the present invention is to provide a V-type internal combustion engine capable of preventing a stain in a crankcase and a transmission case by smoothly exhausting water, or the like, dropped between the crankcase and transmission case and a cylinder block.

These and other objects are accomplished by a V-type internal combustion engine comprising: a crankcase; a pair of cylinder blocks attached to said crankcase, wherein said pair of cylinder blocks form a V shape; and a transmission case provided on a side of said crankcase, wherein said crankcase and said transmission case are joined by a continuous portion, and wherein an uppermost portion of said transmission case is positioned higher than an uppermost portion of said crankcase.

Further, these and other objects are accomplished by a motorcycle comprising: a V-type internal combustion engine including: a crankcase; a pair of cylinder blocks attached to said crankcase, wherein said pair of cylinder blocks form a V shape; and a transmission case provided on a side of said crankcase, wherein said crankcase and said transmission case are joined by a continuous portion, and wherein an uppermost portion of said transmission case is positioned higher than an uppermost portion of said crankcase.

Moreover, these and other objects are accomplished by a vehicle comprising: a V-type internal combustion engine including: a crankcase; a pair of cylinder blocks provided in a V shape attached to said crankcase; and a transmission case provided on a rear side of said crankcase in a connected row arrangement, wherein said crankcase and said transmission case are formed continuously and an upper end portion of said transmission case is positioned so as to be higher than an upper end portion of said crankcase, thereby tilting the upper front portion of said crankcase downward.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
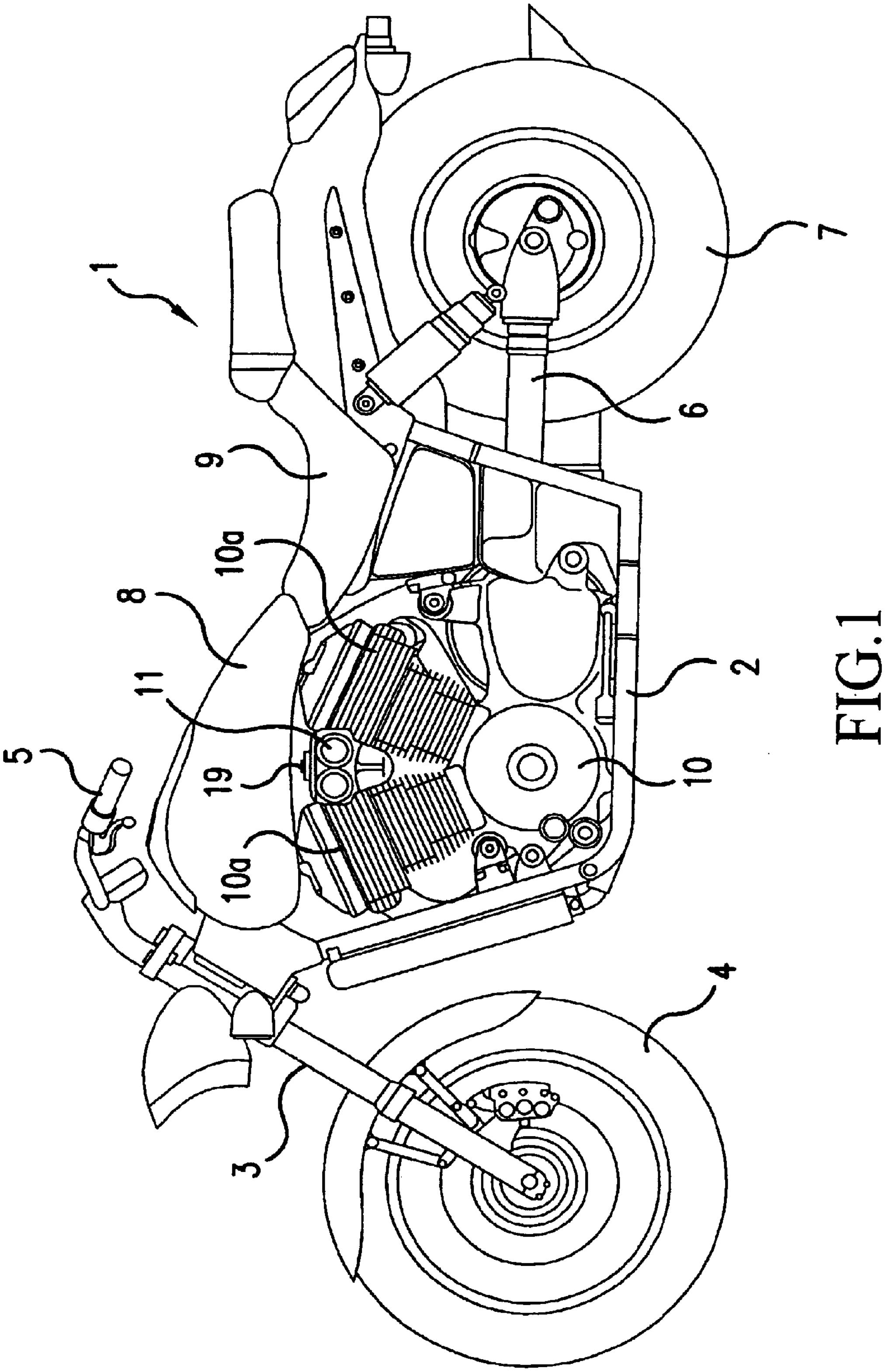
FIG. 1 is a side view of a motorcycle, including a V-type internal combustion engine, in accordance with the present invention.

In FIG. 1, a motorcycle 1 includes a body frame 2 and a front fork 3 attached to a front portion of the body frame 2. A front wheel 4 is rotatably attached to a lower portion of the front fork 3. A steering wheel 5 is attached to an upper portion of the front fork 3. A rear fork 6 is swingably attached to a lower rear portion of the body frame 2. A rear wheel 7 is rotatably attached to a swing end portion of the rear fork 6. A fuel tank 8 is attached over the body frame 2 and behind the steering wheel 5. A seat 9 is attached to a rear side of the fuel tank 8.

A V-type internal combustion engine 10 is attached to the body frame 2 in a position below the fuel tank 8. A throttle body 11 is attached in a space between the V-type internal combustion engine 10 and the fuel tank 8. An air cleaner 19, forming an intake device in accordance with the present invention, is provided below the right side of the fuel tank 8.

Figure 2:
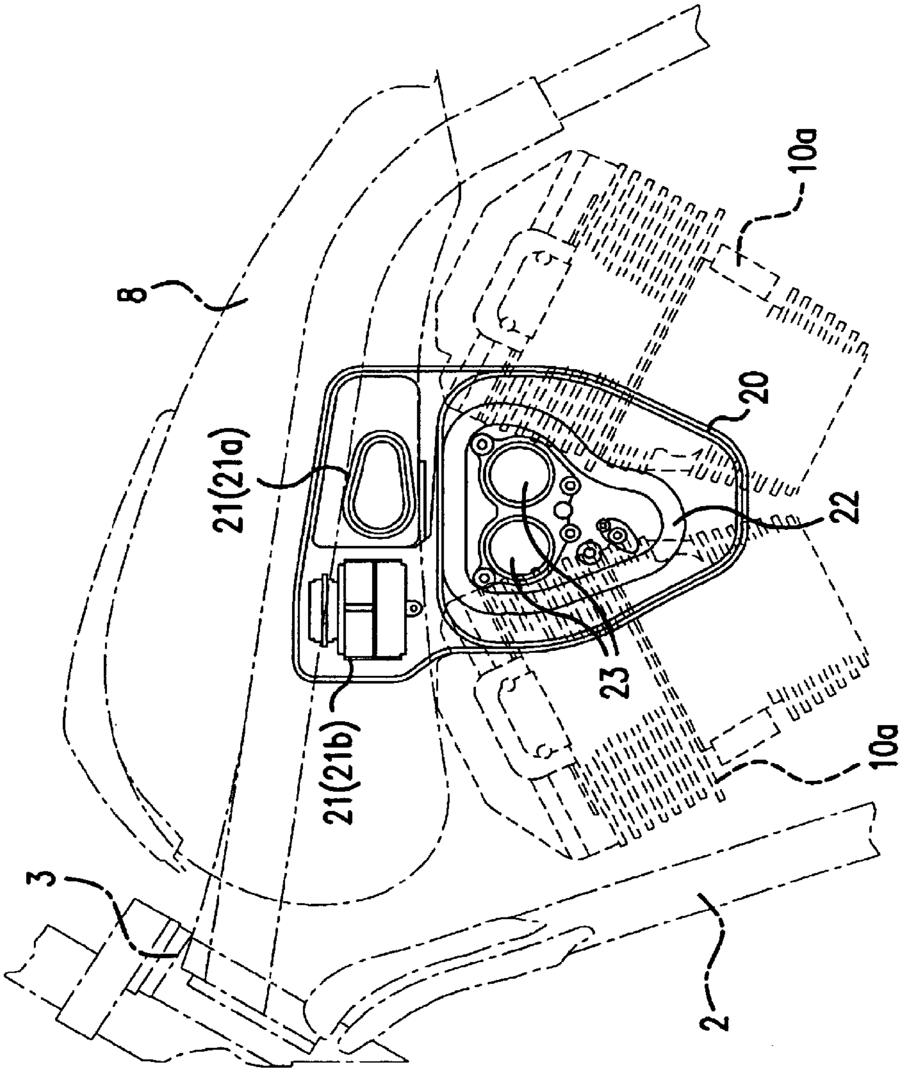
FIG. 2 is a close-up side view of an air cleaner of the motorcycle of FIG. 1.

As shown in FIG. 2, the air cleaner 19 includes an air cleaner case 20. An air duct 21 extends from the upper portion of the air cleaner case 20 to the inside of the vehicle body. An air filter 22 is located inside of the air cleaner case 20. The air cleaner case 20 is attached to the throttle body 11 on the inner face of the vehicle body. The throttle body 11 communicates with the air filter 22 via intake ports 23, formed in the air cleaner case 20.

As illustrated in FIG. 1, the throttle body 11 is positioned between two cylinder blocks 10*a*. The throttle body 11 is oriented to split the longitudinal direction of the V-type internal combustion engine 10. Further, the throttle body 11 is connected to a combustion chamber provided in the upper portion of each of the cylinder blocks 10*a* via an intake pipe (not shown).

Figure 3:
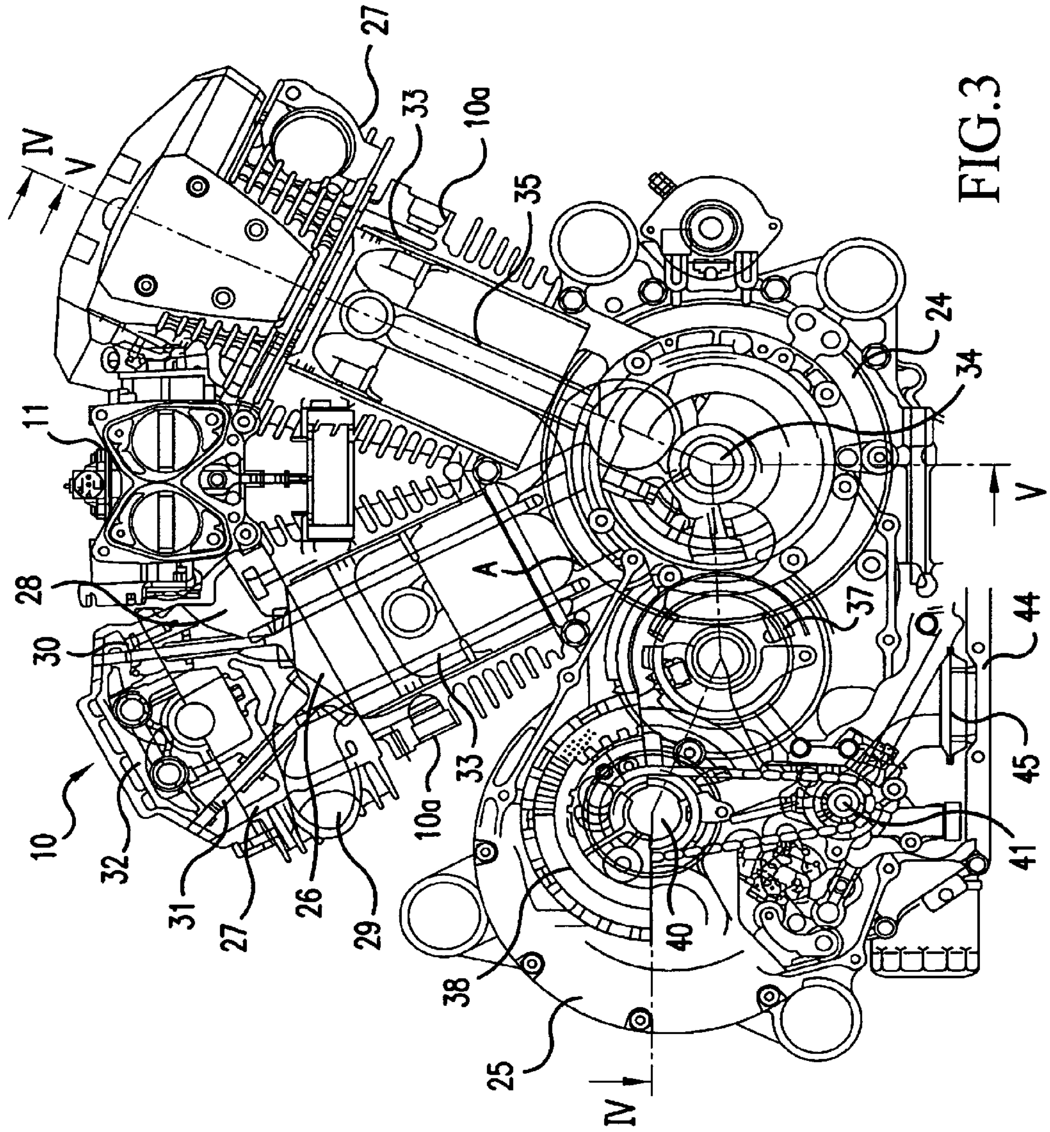
FIG. 3 is a partly broken side view of a V-type internal combustion engine, according to the present invention.
Figure 4:
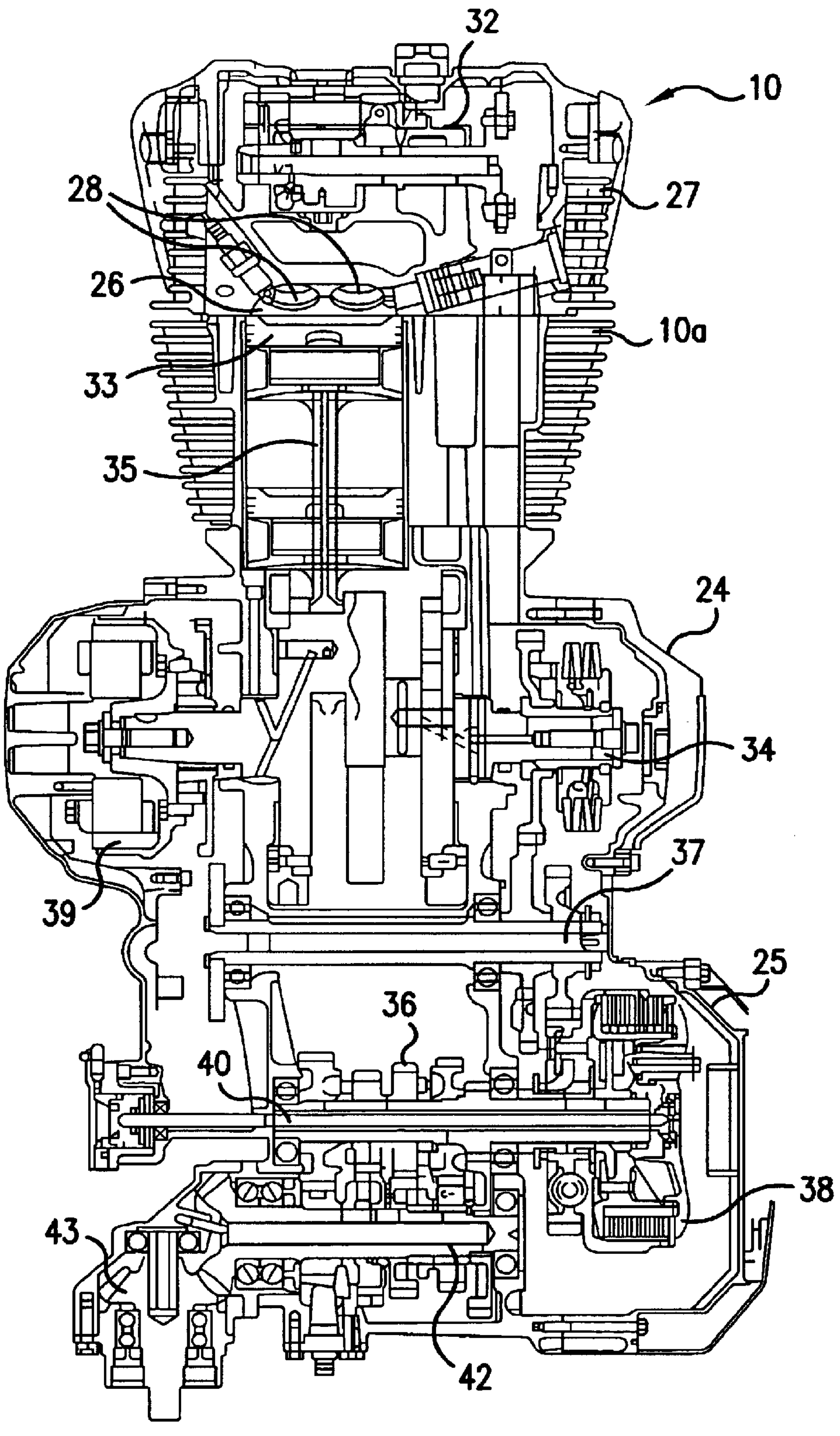
FIG. 4 is a cross sectional view of the V-type internal combustion engine, according to the present invention.

As illustrated in FIGS. 3 and 4, the V-type internal combustion engine 10 has a crankcase 24 to which the pair of cylinder blocks 10*a* are attached, and a transmission case 25 provided on the rear side of the crankcase 24 in a connected row arrangement. As shown in FIG. 3, the upper end portion of the transmission case 25 is positioned higher than that of the crankcase 24. The upper front portion (continuous portion indicated by reference character A in FIG. 3) of the crankcase 24 is tilted downward.

With this configuration of the continuous portion A, the connection portion of the cylinder block 10*a*, positioned on the rear side and the crankcase 24 or transmission case 25, is exposed in a side view.

A cylinder head 27 is attached atop each of the cylinder blocks 10*a*. A combustion chamber 26 is formed between the cylinder head 27 and the cylinder block 10*a*.

An intake path 28 and an exhaust path 29 are formed in the cylinder head 27. The intake path 28 and an exhaust path 29 communicate with the combustion chamber 26. An intake valve 30 and an exhaust valve 31 are reciprocally provided in the cylinder head 27. The intake valve 30 and an exhaust valve 31 open and close the intake path 28 and the exhaust path 29, respectively. A valve train 32 is provided for driving the intake valve 30 and the exhaust valve 31 to their opened/closed states.

A piston 33 is slidably attached on the inside of each of the cylinder blocks 10*a*. The piston 33 is coupled to a crankshaft 34 provided in the crankcase 24 via a connecting rod 35.

A transmission 36 is housed in the transmission case 25. A primary shaft 37 is provided between the transmission 36 and the crankshaft 34. The primary shaft 37 is provided in parallel with the crankshaft 34. The primary shaft 37 transmits rotation of the crankshaft 34 to the transmission 36.

By providing the primary shaft 37 between the crankshaft 34 and the transmission 36, the interval between the crankcase 24 and the transmission case 25 is widened. As a result, a downward tilt of the continuous portion A of the upper end portion of the crankcase 24 and the upper end portion of the transmission case 25 toward the front of the V-type internal combustion engine 10 can be easily assured.

A clutch 38 is provided at an end of the transmission 36. The clutch 38 intermittently transmits rotation between the primary shaft 37 and the transmission 36. As shown in FIG. 3, an oil pump 41 is provided below the transmission 36. The oil pump 41 is driven by an input shaft 40 of the transmission 36.

An oil filter 45 is provided in an oil pan 44 located below the crankcase 24. The oil filter 45 is connected to the oil pump 41. The oil pump 41 sucks oil in the oil pan 44 and supplies it to parts in the V-type internal combustion engine 10.

The transmission 36 includes an output shaft 42. The output shaft 42 is connected to a propeller shaft connected to the rear wheel 7, via a bevel gear 43. A generator 39 is provided on one end of the crankshaft 34. The generator 39 is driven by the crankshaft 34.

In the V-type internal combustion engine 10 according to the present invention, the continuous portion A of the upper end portion of the crankcase 24 and the upper end portion of the transmission case 25 is tilted downward toward the front of the motorcycle. Therefore, the connection portion of the cylinder block 10*a* and the crankcase 24 is exposed when viewed from a side of the motorcycle.

Figure 5:
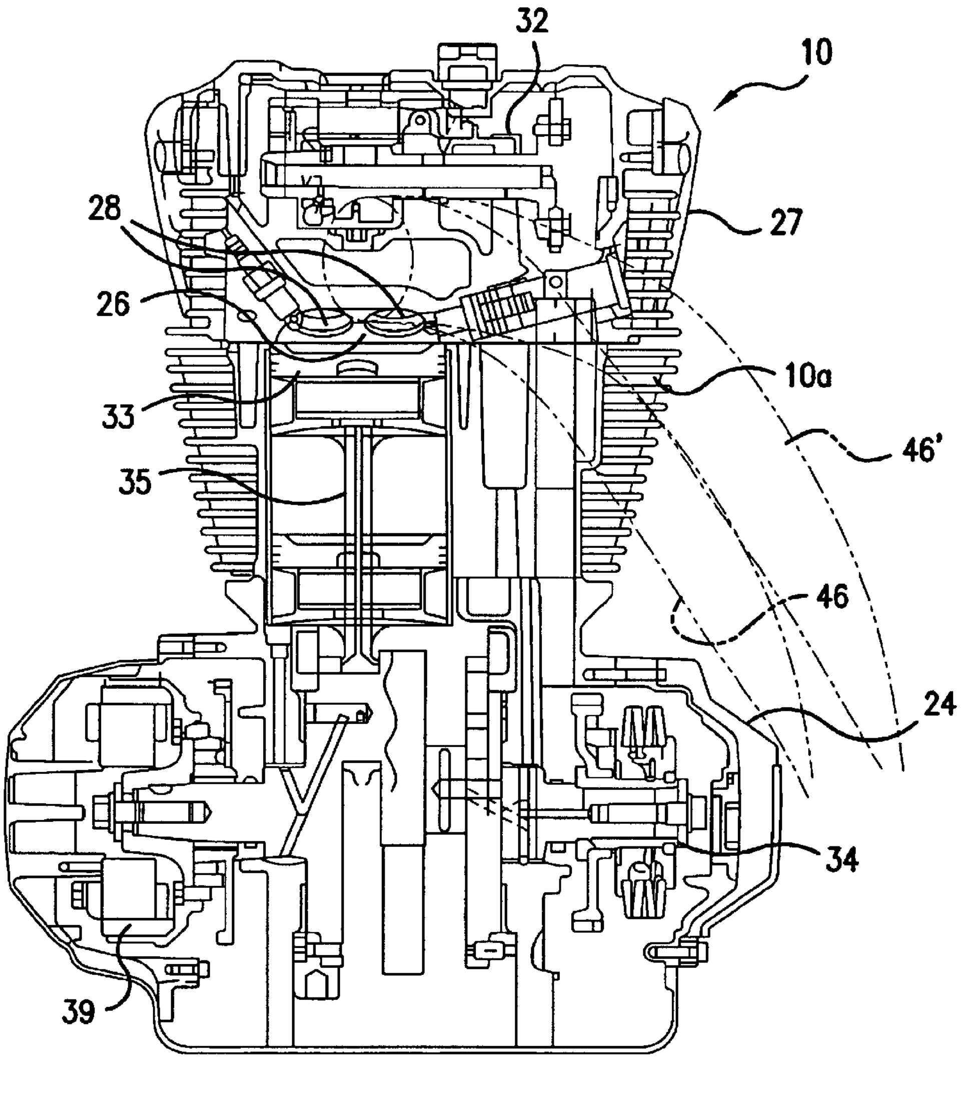
FIG. 5 is a cross sectional view of the V-type internal combustion engine, illustrating a difference in an exhaust pipe location between the present invention and the background art, and illustrating the positional relation between a cylinder block and a crankcase or a transmission case in the present invention.
Figure 6:
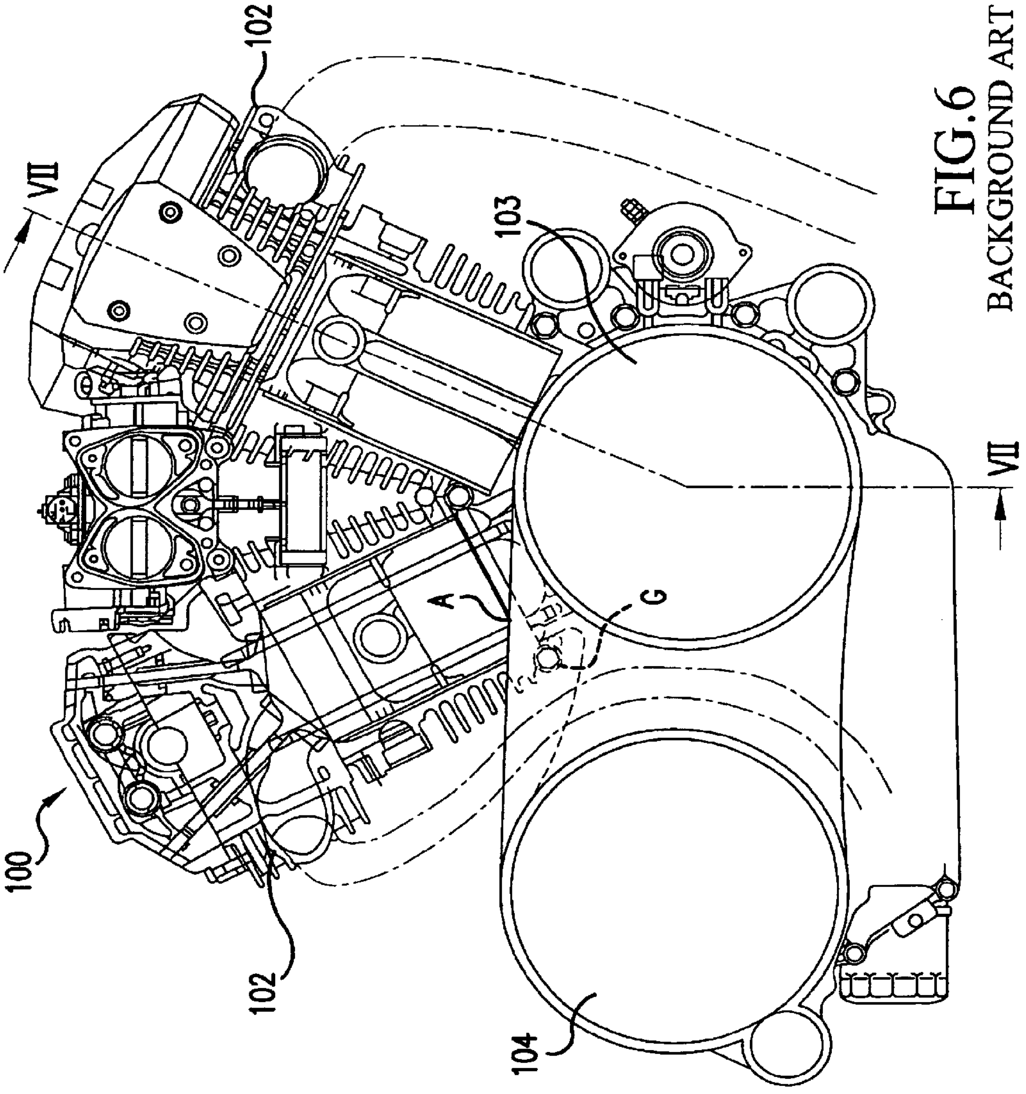
FIG.6 BACKGROUND ART
FIG. 6 is a partly broken away side view of a V-type internal combustion engine, according to the background art.
Figure 7:
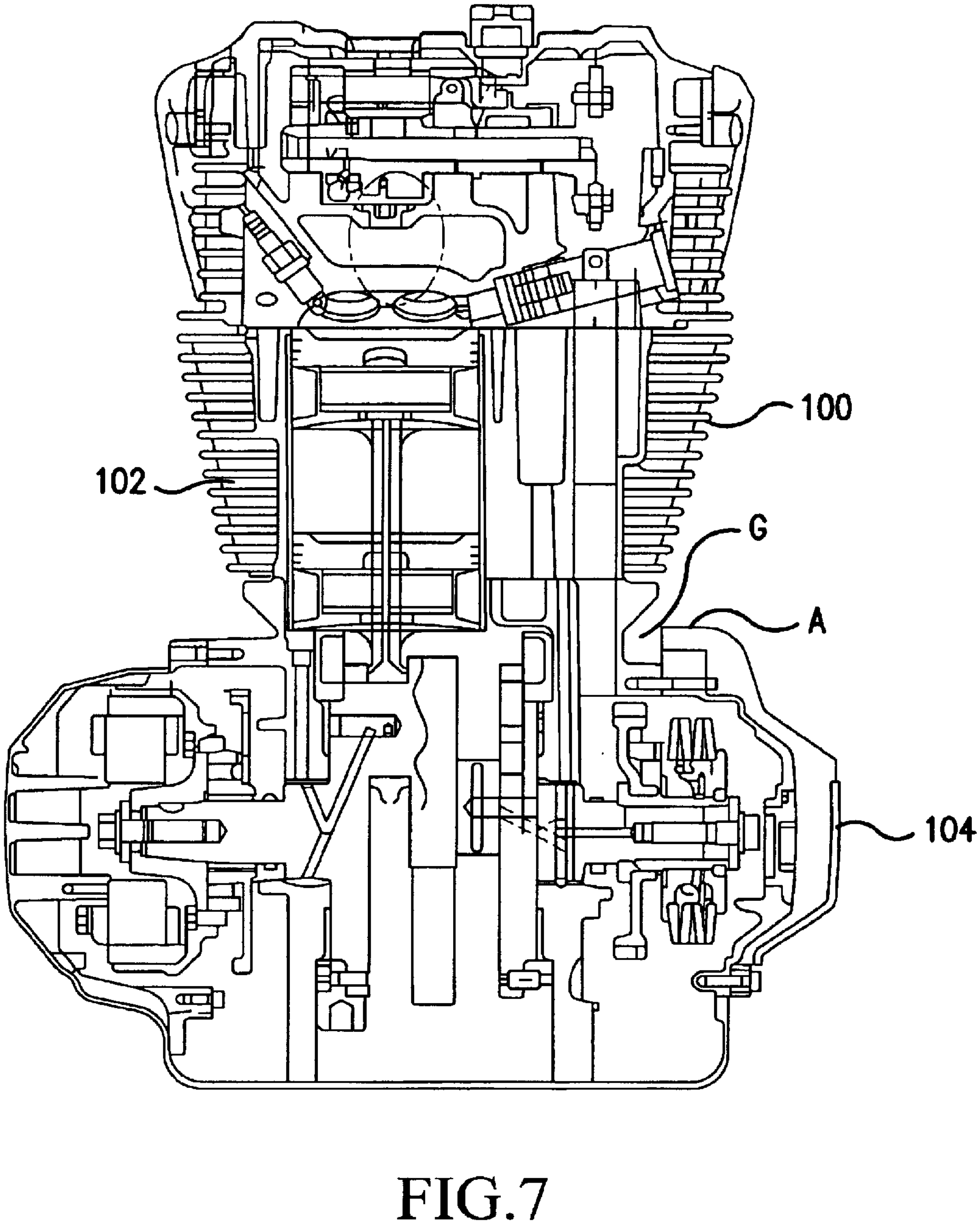
FIG.7 BACKGROUND ART
FIG. 7 is a cross sectional view showing the positional relation between a cylinder block and a crankcase or a transmission case, in accordance with the background art.

As shown in FIG. 5, the gap between the cylinder block 10*a* and the crankcase 24 and the transmission case 25 is eliminated. As a result, even when water, or the like, enters between the cylinder 10*a* and the crankcase 24 and the transmission case 25, the water, or the like, is guided. Specifically, the water, or the like, is guided from the upper end portion of the crankcase 24 and the upper end portion of the transmission case 25 to the side of the V-type internal combustion engine 10 and exhausted below the body. Therefore, occurrence of a stain caused by accumulation of water, or the like, is prevented, while desirable appearance for the motor 10 is maintained. By tilting the continuous portion A of the upper end portion of the crankcase 24 and the upper end portion of the transmission case 25 downward toward the front, the continuous portion A is positioned lower than that in conventional V-type internal combustion engines.

In FIG. 5, the line having alternating one long dash and two short dashes represents a location of an exhaust pipe 46, in accordance with the present invention. Also in FIG. 5, the line having alternating one long dash and one short dash represents a location of an exhaust pipe 46', in accordance with the background art.

In the present invention, the exhaust pipe 46 is provided continuously from the exhaust path 29, formed in the cylinder head 27, and passes through the continuous portion A, which cannot occur in the path of the exhaust pipe 46', in the background art. Therefore, the exhaust pipe 46, of the present invention, can be positioned on the inner side of the V-type internal combustion engine 10. Thereby, the motorcycle 1 can be miniaturized.

According to the present invention, the V-type internal combustion engine has the continuous portion of the upper end portion of the crankcase and the upper end portion of the transmission case titled downward toward the front of the motorcycle. The connection portion of the cylinder block and the crankcase is therefore exposed in the side face direction. This arrangement enables the gap between the cylinder block and the crankcase and the transmission case to be eliminated.

As a result, even when water, or the like, enters between the cylinder block and the crankcase and the transmission case, the water, or the like, is promptly guided to the side portion of the V-type internal combustion engine and exhausted below of the body. Thus, the crankcase and the transmission case can be prevented from getting dirty, while a pleasing design can be assured.

The invention being thus described, it will be obvious that the same may be varied in many ways. For example, the shapes, dimensions, and the like of the components described and illustrated herein are only examples and can be varied or changed as needed, such as to accommodate design requirements. Such variations are not to be regarded as a departure from the spirit and scope of the invention, and all such modifications as would be obvious to one skilled in the art are intended to be included within the scope of the following claims.

I claim:

1. An internal combustion engine comprising:

a crankcase;

a pair of cylinder blocks attached to said crankcase, wherein said pair of cylinder blocks form a V shape; and a transmission case provided on a side of said crankcase, wherein said crankcase and said transmission case are joined by a continuous portion, wherein an uppermost portion of said transmission case is positioned higher than an uppermost portion of said crankcase, and wherein an upper surface of said continuous portion extends in a substantially linear direction from proximate said uppermost portion of said transmission case to said crankcase, such that said upper surface of said continuous portion is tilted downwardly and toward said crankcase, wherein an upper side edge of said crankcase tilts downwardly and away from said continuous portion, such that water at said continuous portion will flow down and away from said continuous portion toward the ground.

2. The internal combustion engine according to claim 1, wherein an upper surface of said crankcase is tilted downwardly and toward said transmission case, such that water on said upper surface of said crankcase will run toward said continuous portion.

3. The internal combustion engine according to claim 1, wherein said crankcase and said transmission case are integrally formed.

4. The internal combustion engine according to claim 1, further comprising:

a pair of cylinder heads attached to said pair of cylinder blocks;

a pair of exhaust paths formed in said cylinder heads; and a pair of exhaust pipes connected to said pair of exhaust paths, wherein one of said pair of exhaust pipes passes adjacent said continuous portion.

5. A motorcycle comprising:

an internal combustion engine including:

a crankcase;

a pair of cylinder blocks attached to said crankcase, wherein said pair of cylinder blocks form a V shape; and a transmission case provided on a side of said crankcase, wherein said crankcase and said transmission case are joined by a continuous portion, and wherein an uppermost portion of said transmission case is positioned higher than an uppermost portion of said crankcase, and wherein an upper surface of said continuous portion extends in a substantially linear direction from proximate said uppermost portion of said transmission case to said crankcase, such that said upper surface of said continuous portion is tilted downwardly and toward said crankcase, wherein an upper side edge of said crankcase tilts downwardly and away from said continuous portion, such that water at said continuous portion will flow down and away from said continuous portion toward the ground.

6. The motorcycle according to claim 5, wherein an upper surface of said crankcase is tilted downwardly and toward said transmission case, such that water on said upper surface of said crankcase will run toward said continuous portion.

7. The motorcycle according to claim 5, further comprising:

a pair of cylinder heads attached to said pair of cylinder blocks;

a pair of exhaust paths formed in said cylinder heads; and a pair of exhaust pipes connected to said pair of exhaust paths, wherein one of said pair of exhaust pipes passes adjacent said continuous portion.

* * * * *